US011119752B2

(12) United States Patent
Hardaker et al.

(10) Patent No.: US 11,119,752 B2
(45) Date of Patent: Sep. 14, 2021

(54) SCALABLY PROVIDING MULTIPLE APPLICATION UPDATES TO MULTIPLE SUBSCRIBERS

(71) Applicant: FinancialForce.com, Inc., San Francisco, CA (US)

(72) Inventors: Paul Lee Hardaker, Ilkley (GB); Vivienne Jane Garvey, Leeds (GB); Rosa Martinez Vera, Granada (ES); Ana Cristina Lopez Calero, Granada (ES); Maria Augustina Garcia Peralta, Munguia (ES)

(73) Assignee: FinancialForce.com, Inc., San Francisco, CA (US)

( * ) Notice: Subject to any disclaimer, the term of this patent is extended or adjusted under 35 U.S.C. 154(b) by 5 days.

(21) Appl. No.: 16/702,182

(22) Filed: Dec. 3, 2019

(65) Prior Publication Data

US 2021/0165648 A1    Jun. 3, 2021

(51) Int. Cl.
| | | |
|---|---|---|
| *G06F 9/445* | (2018.01) | |
| *H04L 29/08* | (2006.01) | |
| *G06F 9/44* | (2018.01) | |
| *H04L 29/06* | (2006.01) | |
| *G06F 8/65* | (2018.01) | |

(52) U.S. Cl.
CPC ............... *G06F 8/65* (2013.01); *H04L 67/26* (2013.01); *H04L 67/34* (2013.01)

(58) Field of Classification Search
CPC ..... H04L 63/0281; H04L 63/20; H04L 63/28; H04L 63/1425; H04L 63/168; H04L 67/14; H04L 67/42; H04L 67/10; H04L 67/26; H04L 67/34; H04L 67/306; H04L 63/123; G06F 16/9535; G06F 9/452; G06F 9/45558; G06F 8/65; G06F 8/71; G06F 8/61; G06F 9/5072
See application file for complete search history.

(56) References Cited

U.S. PATENT DOCUMENTS

| | | |
|---|---|---|
| 8,150,726 B2 | 4/2012 | Merrifield, Jr. et al. |
| 8,195,504 B2 | 6/2012 | Merrifield, Jr. et al. |
| 8,271,319 B2 | 9/2012 | Merrifield, Jr. et al. |

(Continued)

OTHER PUBLICATIONS

Tak et al., Resource Accounting of Shared IT Resources in Multi-Tenant Clouds, 14 pages (Year: 2017).*

*Primary Examiner* — Thuy Dao
(74) *Attorney, Agent, or Firm* — Kokka & Backus, PC

(57) ABSTRACT

Presented here is a system and method to enable a user to manage a large number of applications and a large number of subscribers. The technology presented here can manage up to tens of thousands of update items without a noticeable delay to the user. The technology enables the user to visualize information about multiple applications and multiple numbers of subscribers at the same time, and group the multiple subscribers and multiple applications according to various parameters, such as application name, organization type, update version, etc. Once grouped, the user can perform various operations on the group, such as schedule the updates and/or edit the updates, by adding or removing a large number of items at once. Further, the system is structured so that the operations on the large number of items can be performed without a noticeable delay to the user.

18 Claims, 10 Drawing Sheets

(56) References Cited

U.S. PATENT DOCUMENTS

| | | |
|---|---|---|
| 8,543,447 B2 | 9/2013 | Corneil et al. |
| 8,655,711 B2 | 2/2014 | Merrifield, Jr. et al. |
| 10,108,533 B1* | 10/2018 | Parasuraman ...... G06F 11/3664 |
| 10,824,648 B2* | 11/2020 | Srivastava ................ G06F 8/61 |
| 2016/0254963 A1* | 9/2016 | Vibhor ............... H04L 41/0889 |
| | | 709/222 |
| 2019/0317824 A1* | 10/2019 | Mani ......................... G06F 9/48 |

* cited by examiner

FINANCIALFORCE
Subscribers Management Console

ⓘ Service Pack    Logout

Manage Subscribers

Clear Filters

| Push Ring ▼ | Instance ▼ | Account ▼ | Product ▼ | Version ▼ | Version Name ▼ | Org Name ▼ | Org Type ▼ | Org Id ▼ | SP Push ▼ | Reason ▼ |
|---|---|---|---|---|---|---|---|---|---|---|
| Select Push Ring | Enter Instance | Enter Account | Enter Product | Enter Version | Enter Version Name | Enter Org Name | Select Org Type | Enter Org Id | Select SP Push | Enter Reason |
| 3 | EU12 | Account8 | FinancialForce ERP core | 1.8.0 | Spring 2019.3 | Azur University | Production | 00D1t000000cg4X | Include | |
| 9 | NA57 | Account-Test-290 | pushtest | 2.1.1 | Spring 2019.1 | SMC Test 492 | Production | 00D0b000000QvEc | Include | |
| Test Ring | EU16 | Account10 | FinancialForce accounting | 3.9.0 | 3.9.0 | Jenkins Test Co | Production | 00D1t000000DVwB | Include | |
| Test Ring | AP4 | Account13 | pushtest | 1.8.0 | 1.8 | EMAP Publishing | Production | 00D6F000002KLsC | Include | |
| 3 | NA53 | FF Push Test | pushtest | 1.7.0 | Fall 2018.12 | Bluewater learning | Sandbox 275 | 00D12000001LIxm | Include | |
| 3 | EU8 | Account1 | Block chain | 1.8.0 | 1.8 | ARMS Reliability | Production | 00D0N000001Ooy0 | Include | |
| 3 | EU16 | Account-Test-39 | FinancialForce ERP core | 1.7.0 | PS into CA | Jenkins Test Co | Production | 00D1t000000DgQ1 | Include | |
| 9 | NA57 | Account-Test-276 | pushtest | 1.8.0 | 1.8 | SMC Test 476 | Production | 00D0b000000QuIq | Include | |
| 9 | NA57 | Account-Test-288 | pushtest | 2.8.0 | 1.8 | SMC Test 490 | Production | 00D0b000000QvBh | Include | |
| 1 | NA35 | Account6 | pushtest | 1.5.0 | With Conn App | Cris HCM | Production | 00D41000000dKkh | Include | |

10 ▼   Showing 663 Accounts

1 | 2 | 3 | 4 | Next | Last

*FIG. 2*

FINANCIALFORCE
Subscribers Management Console

ⓘ Service Pack    Logout

Manage Subscribers

Clear Filters

| Push Ring ▼ | Instance ▼ | Account ▼ | Product ▼ | Version ▼ | Version Name ▼ | Org Name ▼ | Org Type ▼ | Org Id ▼ | SP Push ▼ | Reason ▼ |
|---|---|---|---|---|---|---|---|---|---|---|
| Select Push Ring | EU | Enter Account | Enter Product | 1.8 | Enter Version Name | Enter Org Name | Select Org Type | Enter Org Id | Select SP Push | Enter Reason |
| 3 | EU12 | Account6 | FinancialForce ERP core | 1.8.0 | Winter 2020.1 | Jenkins Test Co | Testing | 00D1r000000cg4X | Include | |
| Test Ring | EU16 | Account10 | pushtest | 1.8.0 | 1.8 | Jenkins Test Co | Production | 00D1t000000DVwvB | Include | |
| 3 | EU8 | Account1 | FinancialForce accounting | 1.8.0 | 1.8 | Jenkins Test Co | Production | 00D0N000001Ooy0 | Include | |
| Test Ring | EU9 | Account3 | pushtest | 1.8.0 | 1.8 | CODA | Production | 00D2O000030rjC3 | Include | |
| Test Ring | EU16 | Account2 | pushtest | 1.8.0 | 1.8 | Jenkins Test Co | Production | 00D1t000000DX3R | Include | |
| 8 | EU16 | Account-Test-112 | pushtest | 1.8.0 | 1.8 | SMC Test 42 | Production | 00E1t000000EIMX | Include | |
| 9 | EU16 | Account-Test-119 | pushtest | 1.8.0 | 1.8 | SMC Test 45 | Production | 00D1t000000Elom | Include | |
| 9 | EU16 | Account-Test-206 | pushtest | 1.8.0 | 1.8 | SMC Test 204 | Production | 00D1t000000EKdm | Include | |
| 8 | EU16 | Account-Test-214 | pushtest | 1.8.0 | 1.8 | SMC Test 212 | Production | 00D1t000000EKhe | Include | |
| 9 | EU16 | Account-Test-305 | pushtest | 1.8.0 | 1.8 | SMC Test 511 | Production | 00D1t000000ESUA | Include | |

10 ▼   Showing 245 Accounts

1 | 2 | 3 | 4 | Next | Last

SCALABLY PROVIDING MULTIPLE APPLICATION UPDATES TO MULTIPLE SUBSCRIBERS

TECHNICAL FIELD

The present application is related to managing software applications, and more specifically, to methods and systems that scalably provide multiple application updates to multiple subscribers.

BACKGROUND

Application platforms, such as Salesforce, can provide a large number of applications to a large number of subscribers. A user of the application platform may need to provide multiple updates of multiple applications to multiple subscribers. When the number of update items (i.e., the number of updates multiplied by the number of subscribers) exceeds 50, the current application platforms, such as Salesforce, do not provide an interface that can manage the large number of update items. Instead, the current application platforms require the user to manage a large number of update items based on a single product and a single version. For example, Salesforce user interface (UI) only allows the user to update one product at a time. In another example, Salesforce requires the user to log in to every single application to obtain subscribers of the application, and any errors produced upon installation of the update. In addition, the processor time required to perform some of the actions on a large number of subscribers require approximately 20 minutes to complete.

SUMMARY

Presented here is a system and method to enable a user to manage a large number of applications and a large number of subscribers. The technology presented here can manage up to tens of thousands of update items without a noticeable delay to the user. The technology enables the user to visualize information about multiple applications and multiple numbers of subscribers at the same time, and group the multiple subscribers and multiple applications according to various parameters, such as application name, organization type, update version, etc. Once grouped, the user can perform various operations on the group, such as schedule the updates and/or edit the updates, by adding or removing a large number of items at once. Further, the system is structured so that the operations on the large number of items can be performed without a noticeable delay to the user.

BRIEF DESCRIPTION OF THE DRAWINGS

FIG. 2 shows the user interface capable of visualizing multiple organizations and multiple products at once.

FIG. 3 shows the user interface enabling grouping multiple organizations according to various parameters for easier visualization, according to one embodiment.

FIG. 4 shows the user interface enabling the grouping of organizations according to various parameters for easier visualization, according to another embodiment.

FIG. 6 shows the user interface capable of authorizing an update of multiple applications to multiple organizations using a single action.

DETAILED DESCRIPTION

Scalably Providing Multiple Application Updates to Multiple Subscribers

Presented here is a system and method to enable a user to manage a large number of applications and a large number of subscribers. The technology presented here can manage up to tens of thousands of update items without a noticeable delay to the user. The technology enables the user to visualize information about multiple applications and multiple number of subscribers at the same time, and group the multiple subscribers and multiple applications according to various parameters such as application name, organization type, update version, etc. Once grouped, the user can perform various operations on the group, such as schedule the updates and/or edit the updates, by adding or removing a large number of items at once. Further, the system is structured so that the operations on the large number of items can be performed without a noticeable delay to the user.

Figure 1:
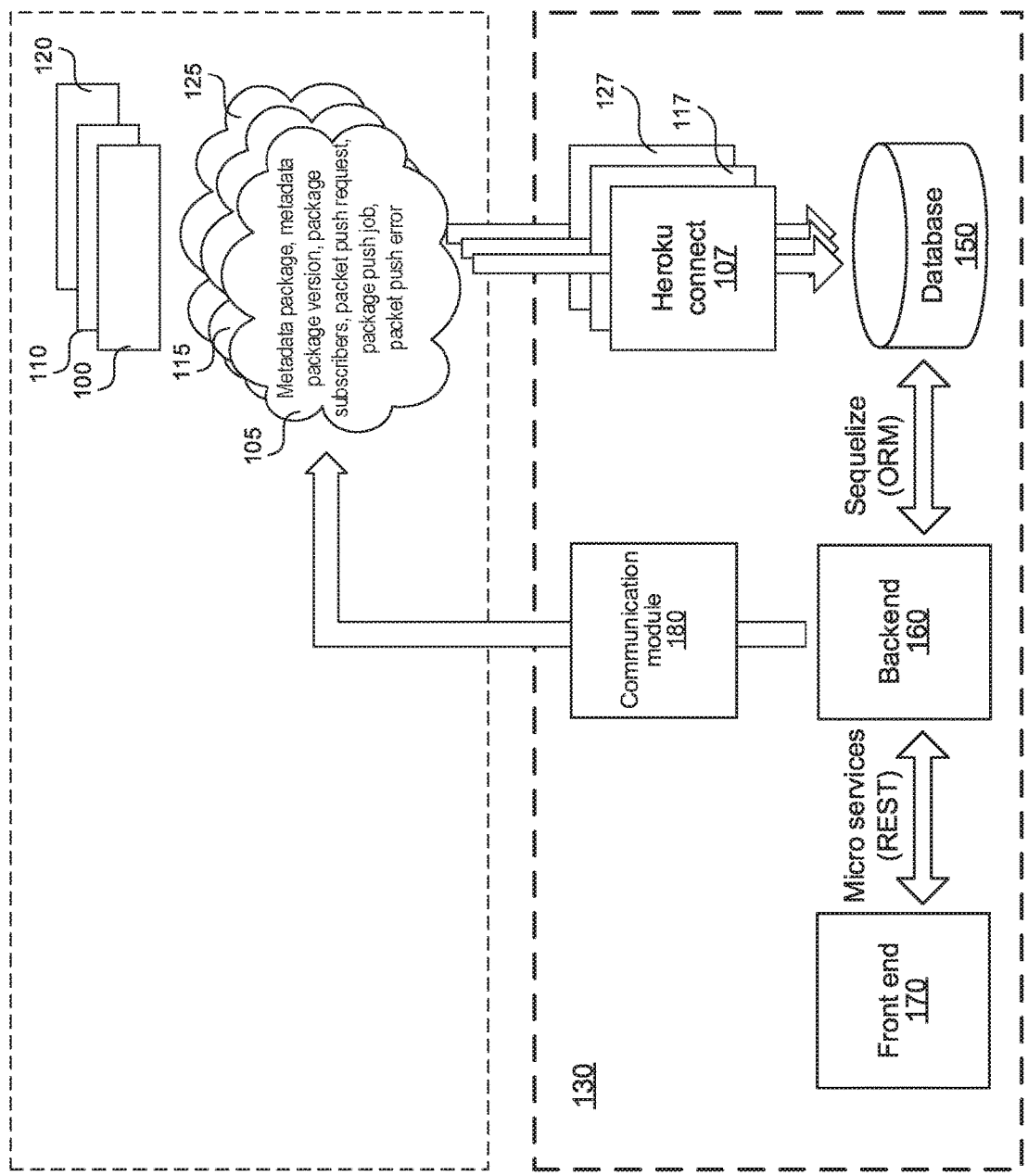
FIG. 1 shows a system to efficiently update multiple software packages to multiple organizations.

FIG. 1 shows a system to efficiently update multiple software packages to multiple organizations. An update can include installation of a new software package or an upgrade of an existing software package. A software package can include one or more software applications (i.e., applications). Multiple organizations 100, 110, 120 can subscribe to multiple software applications 105, 115, 125, provided by a vendor platform 130. When there are large numbers of organizations to manage, such as 100 subscribing organizations, and/or a large number software applications, such as 50 software applications, multiple issues of scale arise. Specifically, when updating on the order of 1,000 or more organizations and/or software applications, the issues of computer speed and ease of use of the user interface become relevant.

Regarding the computer speed, if the vendor platform 130 has one subscribing organization and one application, and the computer takes 1 second to provide information regarding the software applications 105, 115, 125, the resulting wait of 1 second is an acceptable time to wait to receive information. However, if the vendor platform 130 has 1,000 subscribing organizations and/or applications, and the computer takes 1 second to provide information regarding each of the software applications 105, 115, 125 (only 3 labeled for brevity), the resulting wait of 1,000 seconds (i.e., 17 minutes) to receive information is too long.

Regarding the ease-of-use of the user interface, such as a graphical user interface or a voice user interface, if the vendor platform 130 has one subscribing organization and one application, and the vendor platform 130 has to individually authorize the update for each organization and each application, requiring the user to make one authorization is acceptable. However, if the vendor platform 130 has 500 subscribing organizations and/or applications, and the vendor platform 130 has to individually authorize each update for each organization in each application, requiring the user to make 500 authorizations, one by one, is a cumbersome workflow.

The present application resolves the above issues of scale that arise when a vendor platform 130 has to manage a large number of organizations 100, 110, 120 which subscribe to a large number of software applications 105, 115, 125, by providing information regarding a large number of applications and/or subscribing organizations within less than 1 second, and by enabling the user to perform a single operation on a large number of applications and/or subscribing organizations.

The vendor platform 130 can operate multiple applications 105, 115, 125 within a software platform such as a Salesforce software platform. The vendor platform 130 can provide an intermediate module 107, 117, 127, such as a Heroku connect module, which can act as an intermediary between the applications 105, 115, 125 and a database 150. The intermediate module 107, 117, 127 can receive information from the subscribing organizations 100, 110, 120 regarding the software applications 105, 115, 125 and can store the information in the database 150. The information can include the current software applications 105, 115, 125 that each subscribing organization 100, 110, 120 has, the versions of the software applications 105, 115, 125, suborganizations within the organization that utilizes the application 105, 115, 125, request for the next update of the package, information about the next update of the package, messages and errors generated during the update, whether the subscribing organization 100, 110, 120 wants to be a beta tester, etc.

The backend 160 can retrieve information from the database 150, and determine the status of the subscribing organization 100, 110, 120 and/or status of the applications 105, 115, 125, such as which subscribing organizations 100, 110, 120 should receive which versions of the software applications 105, 115, 125, whether any updates need to be made, and/or what the status of the update is.

The back end 160 can provide the received information to the front end 170, which can present the information through user interface designed to enable operation of scale such as visualization of large amounts of data and operation on a large amount of data at once.

The back end 160 can also communicate with the applications 105, 115, 125 used by the subscribing organizations 100, 110, 120 using the communication module 180. The communication module 180 can be implemented using Salesforce SOAP (application programmer interface) API. In contrast to the intermediate modules 107, 117, 127, the communication module 180 is designed to handle a large number of requests. As can be seen from the architecture, the intermediate module 107, 117, 127 provides a communication channel from the applications 105, 115, 125, respectively, to the database 150. The intermediate module 107, 117, 127 is responsible for communication with one subscribing organization 100, 110, 120, and the amount of data received from one subscribing organization 100, 110, 120 is limited. By contrast, the communication module 180 can send data to multiple subscribing organizations 100, 110, 120. For example, to create a request for an update, the intermediate module 107, 117, 127 can take up to 10 minutes, while the communication module 180 can perform the task in real time, with a delay of less than 1 second.

The communication module 180 implements a queue system that can have multiple API calls to different applications 105, 115, 125 and upgrade different products used by one or many subscribing organizations 100, 110, 120, one after another. The advantage of utilizing the communication module 180 is that the API call from the queue system can be made every second, as opposed to having to wait approximately 10 minutes for each API call to complete, before making the next API call.

In the salesforce context, if the connection module 180 is implemented using Heroku Connect, the time between each API call would take approximately 10 minutes. In contrast, SOAP API can make a call every second and just wait till Salesforce handles all of the calls.

FIG. 2 shows the user interface capable of visualizing multiple organizations and multiple products at once. Other platforms, such as Salesforce, can only show the list of eligible organizations, once the product has been selected. In other words, other platforms can only show organizations associated with a single product. The user interface 200 can show multiple products in column 210, and multiple organizations in column 220 associated with the multiple products 210. In addition, the user interface 200 can show the version and the version name of the software in columns 260, 230, respectively. The user interface 200 can show multiple items 280 (only one labeled for brevity) as rows in the user interface 200. Each item can represent specific values of parameters such as 210, 220, 230, 240, 250, 260, 270.

In addition, the user interface 200 can show additional information related to the subscribing organizations 100, 110, 120 in FIG. 1, such as an account 240, an organization ID in column 250, an organization name in column 220, and/or an organization type in column 270. The user interface 200 allows the user to visualize various organization information associated with organizations that use supported applications 105, 115, 125 in FIG. 1. By contrast, a Salesforce application user interface can only show organization name and organization ID, while the other information is not provided.

Accounts 240 can provide the human-readable identification of the account that the vendor platform 130 in FIG. 1 uses to represent the organization 100, 110, 120. Organization ID 250 can be a unique alphanumeric string associated with the organization 100, 110, 120. Organization name 220 is the name of the organization 100, 110, 120. Organization type 270 can indicate whether the organization uses applications 105, 115, 125 that are production ready, or whether the organization can act as a tester, for example, as denoted by "sandbox" in field 275. If the organization type can act as a tester, an earlier version of an update can be pushed to the organization for testing, prior to releasing the update to the production organizations.

FIG. 3 shows the user interface enabling grouping multiple organizations according to various parameters for easier visualization, according to one embodiment. The user interface 200 enables visualization of a single push request. A push request can include an update of a product to a subscribing organization. A visualization of the single push request in the user interface 200 can group all subscribing organizations 220 that are eligible and/or interested in an update, even if the updates are related to different products. As explained in this application, an update can include installing a completely new software application or upgrading an already installed software application.

By contrast, other platforms, such as Salesforce, require a separate login for every single product 210 in order to schedule a push request, check subscribing organization status, and/or check push request errors. Other platforms, such as the Salesforce user interface, can take approximately 20 minutes to display eligible subscribers, such as the ones listed in column 220, after selecting the product in column 210 and the version of the product column 260. By contrast, the technology disclosed here takes only several seconds to show eligible subscribing organizations 220 based on product 210 and version 260 selection.

In addition, the user interface 200 enables grouping of data displayed in the user interface 200 based on various parameters, such as account 240, product 210, version 260, versioning 230, organization 220, organization type 270, and/or organization ID 250. To group the data, the user can specify the desired group in the user interface elements 215, 265, 225, 270 (only 4 labeled for brevity). With only a few inputs, such as to interface elements 215, 265, 225, 270, the user can remove a large number of entries from the user interface 200.

For example, when the user enters the version number, such as "1.8," into the user interface element 265, the user interface 200 can only show data associated with subscribers who are eligible to receive an update of a software package whose version is 1.8. By enabling the user to visualize the data along the various parameters (i.e. dimensions, such as 240, 210, 260, 230, 220, 270, 250), the user can more quickly determine which organizations need which updates. In another example, the user can specify the instance name, such as "EU," as shown in user interface element 270. Consequently, the user interface 200 can only show data associated with subscribers whose instance name contains "EU." Multiple filtering criteria can be specified at the same time within the user interface elements 215, 265, 225, 270.

Figure 4:
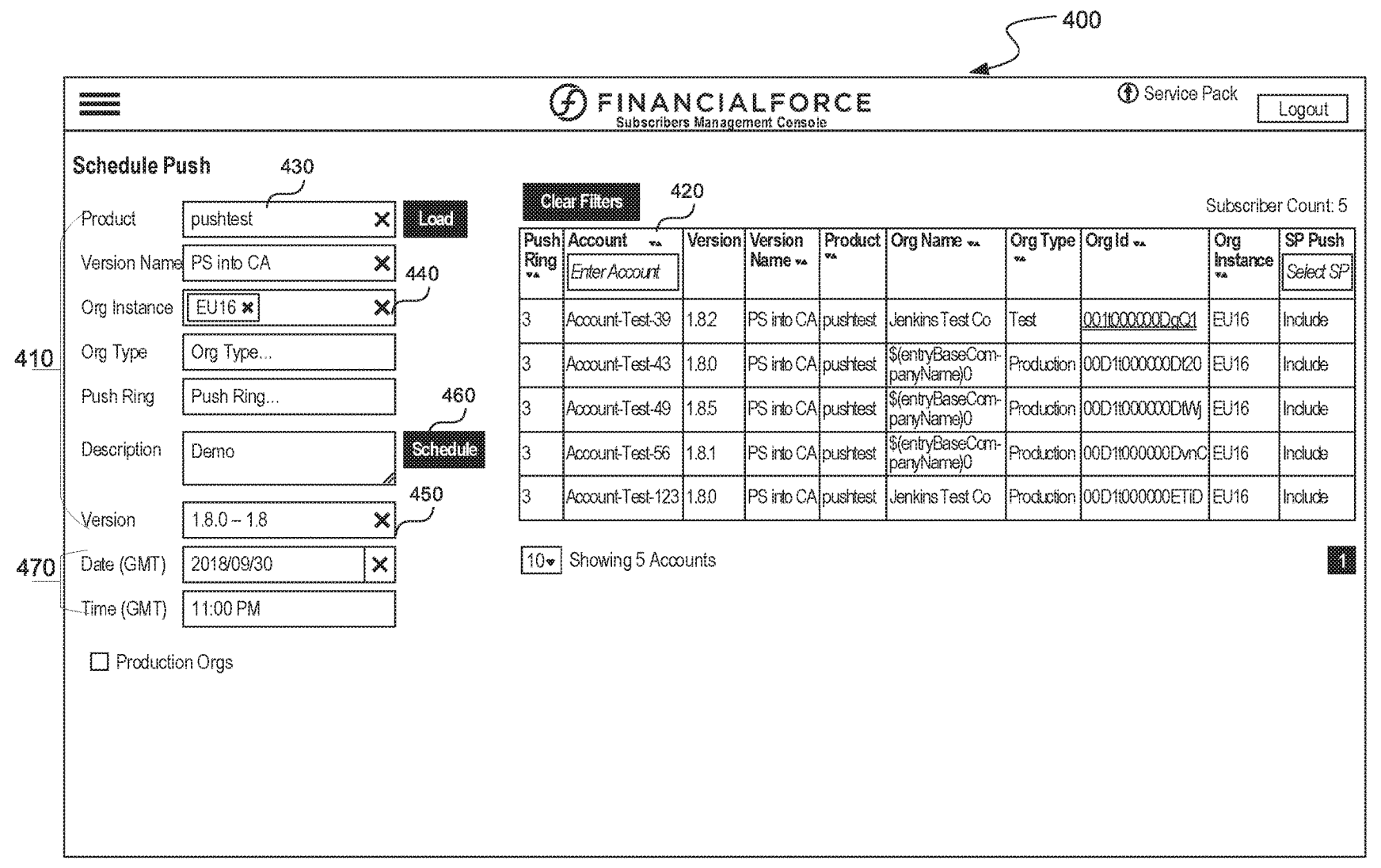

FIG. 4 shows the user interface enabling the grouping of organizations according to various parameters for easier visualization, according to another embodiment. The user interface 400 can enable the user to specify various parameters 410 at the same time and can display the data associated with organizations that meet the specified parameters. For example, the user can specify that the product is "push test," that the version name is "PS into CA," org instance is "EU16," and product version is "1.8.0-1.8." Consequently, the interface element 420 displays information for products named "push test" only, having the version name "PS into CA," having org instances "EU 16," and having a product version in the range between "1.8.0-1.8." The user can specify multiple entries in the fields 430, 440, 450 (only 3 labeled for brevity). In addition, the user can specify ranges, as can be seen in field 450. Using the schedule button 460, the user can schedule the release of the update on a specified date and time 470.

Figure 5:
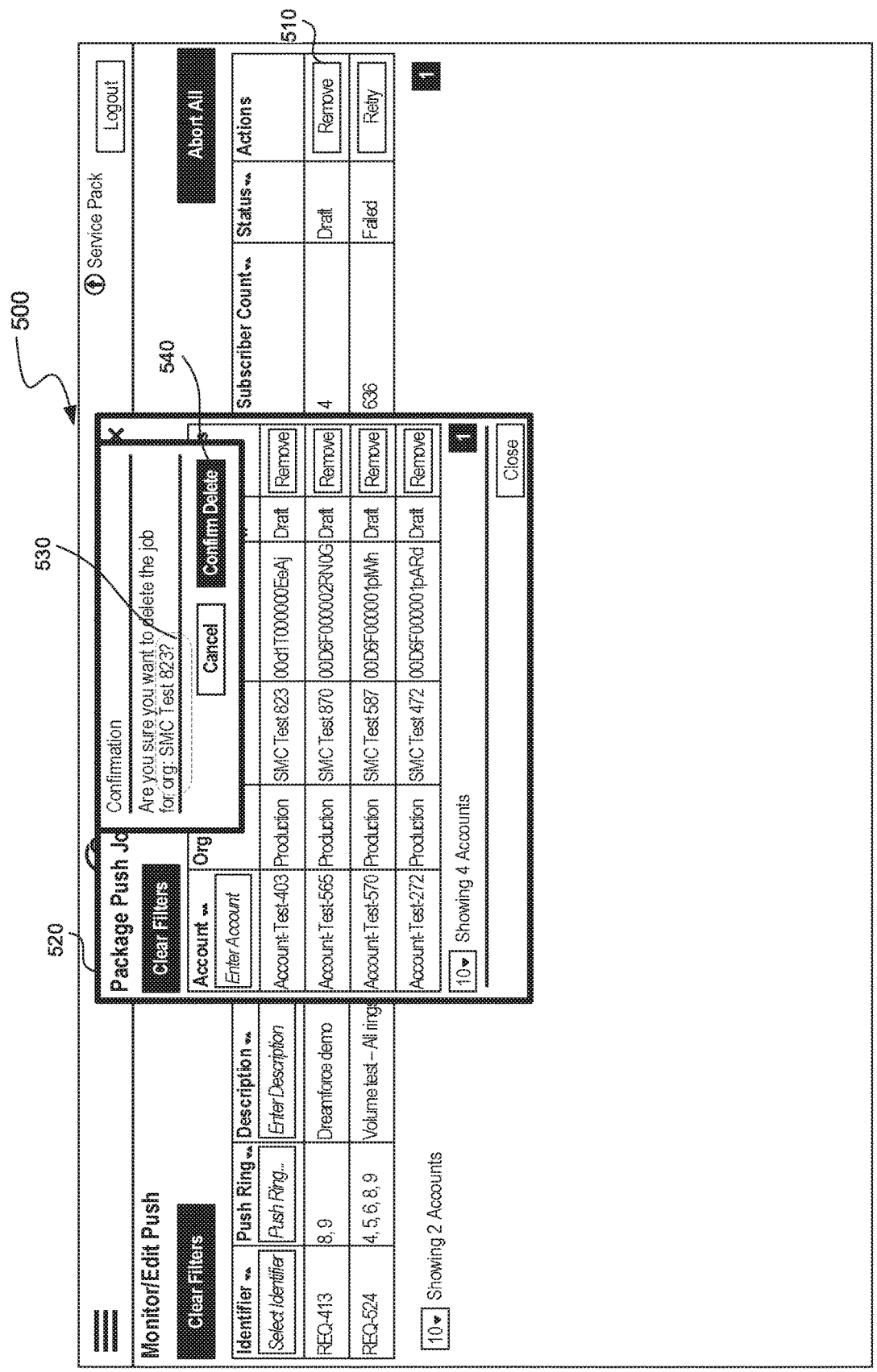
FIG. 5 shows the user interface for editing a large number of product updates with only a few inputs.

FIG. 5 shows the user interface for editing a large number of product updates with only a few inputs. The number of product updates to push to the subscribing organizations can exceed 1,000. Having to individually edit updates can be a cumbersome task. The editing can include removing unwanted updates or adding updates. The user interface 500 can enable the user to edit multiple updates with only a few inputs.

For example, the user can specify one or more of the parameter 410 in FIG. 4, and parameters 210, 220, 230, 240, 250, 260, 270 in FIG. 2. By specifying, for example, one parameter, the user can isolate hundreds of subscribing organizations which match the specified parameter. The parameter can be, for example, an organization name 220 in FIG. 2. The user element 510 can enable the user to remove an individual organization from the update. The user element 520, can enable the user to remove a group of organizations matching the specified parameter 530, from the update. The specified parameter 530 can isolate tens or hundreds of organizations, while an authorization through the user element 540, enables the tens or hundreds of organizations to be removed from the updates with a single click, thus saving a considerable amount of time.

By contrast, other platforms' user interfaces, such as the Salesforce user UI, only allows you to cancel a whole push request and start from scratch. Canceling the whole push request and reselecting the organizations that should receive the push can require an additional one or more hours of the user's time, as well as additional processor time consumed in repeating the same task twice. Given that a push can involve up to tens of thousands of entries involving the various organizations and various packages, the wasted processor time can be measured in minutes.

Figure 6:
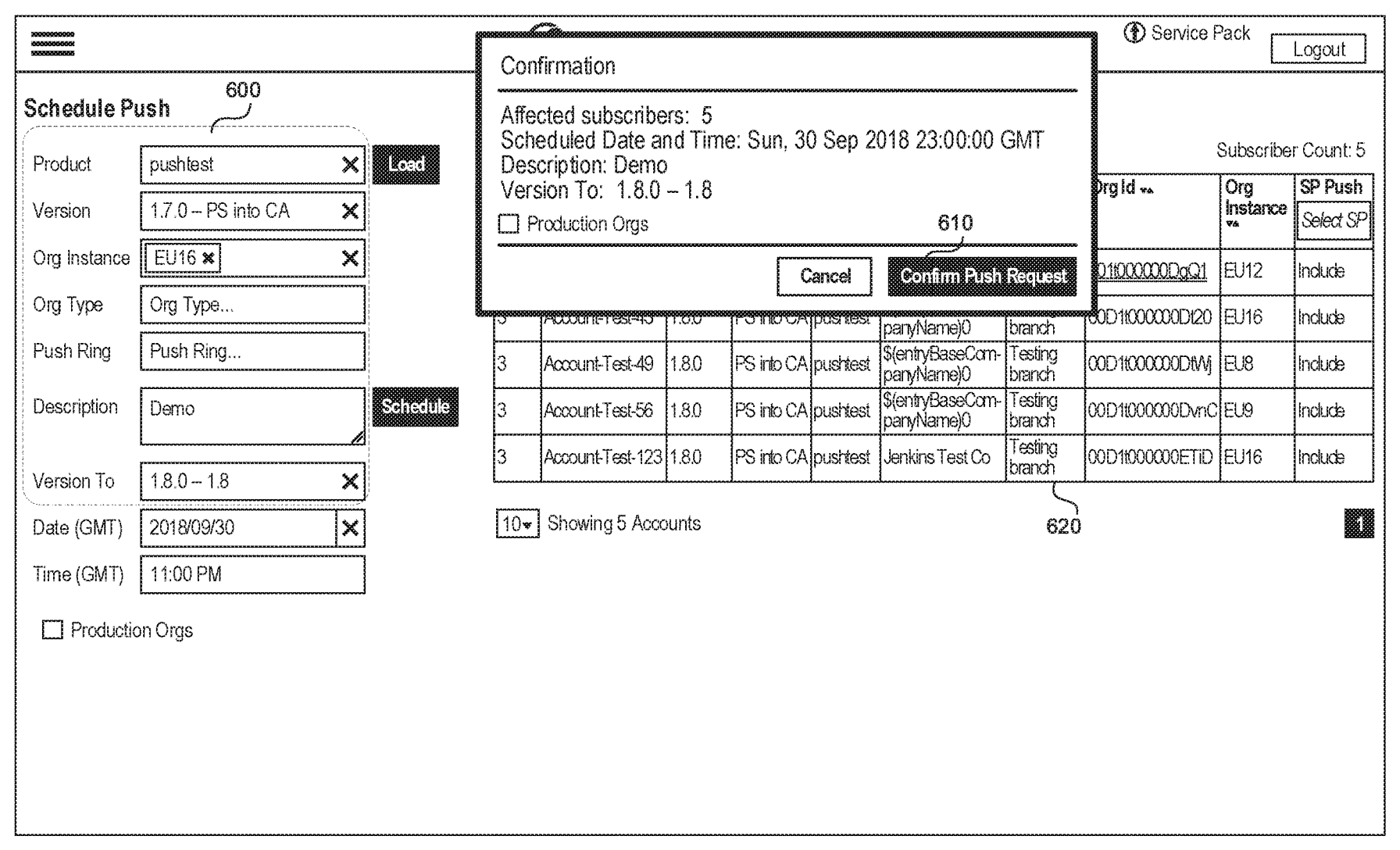

FIG. 6 shows authorizing an update of multiple applications to multiple organizations using a single action. After selecting multiple organizations that are to receive multiple updates of multiple applications through the user element 600, a single authorization through the user element 610 can launch the update to the multiple organizations. In other platforms' user interfaces such as Salesforce, a user has to separately log in for every single application in order to schedule the push related to that application and version.

The technology disclosed herein can automatically push update to a test branch, i.e. sandbox, of the organization, prior to releasing the updates to the production branch of the organization, as shown in the user interface element 620. The test branch of the organization can have an opportunity to test out the update and identify any potential problems. Upon a passage of predefined period of time, during which no problems were reported, the production organization can automatically receive the update. However, if the update of the test branch fails, or a predefined number of problems is reported within a predefined amount of time, the updates to the production branch of the organization will not start.

For example, the decision whether to update the production branch of the organization can be done by a person, or can be done automatically. To make the automatic decision, the processor can take into account the number of outstanding problems (e.g., bugs), and the severity of each problem. The problems can be categorized into levels such as 1, 2, 3, where a level 1 problem is a showstopper, a level 2 problem should be fixed within a predefined period of time, and a level 3 problem describes a feature that is nice to have but not essential. If there are any level 1 problems, the processor can determine to not push the update to the production branch of the organization. If there are only level 2 and 3 problems, the processor can determine to release the updates to the production branch. By contrast, other platforms, such as Salesforce, are not able to isolate the test branch of the organization related to the production branch, and do not provide the functionality of initially updating the test branch prior to updating the production branch.

In addition, the technology disclosed herein can run the applications to be provided to subscribing organizations through a test suite, such as Salesforce ISV Hammer, which automatically tests the performance of the applications. The test suite can identify problems prior to pushing the updates to the testing and/or production branches.

Figure 7:
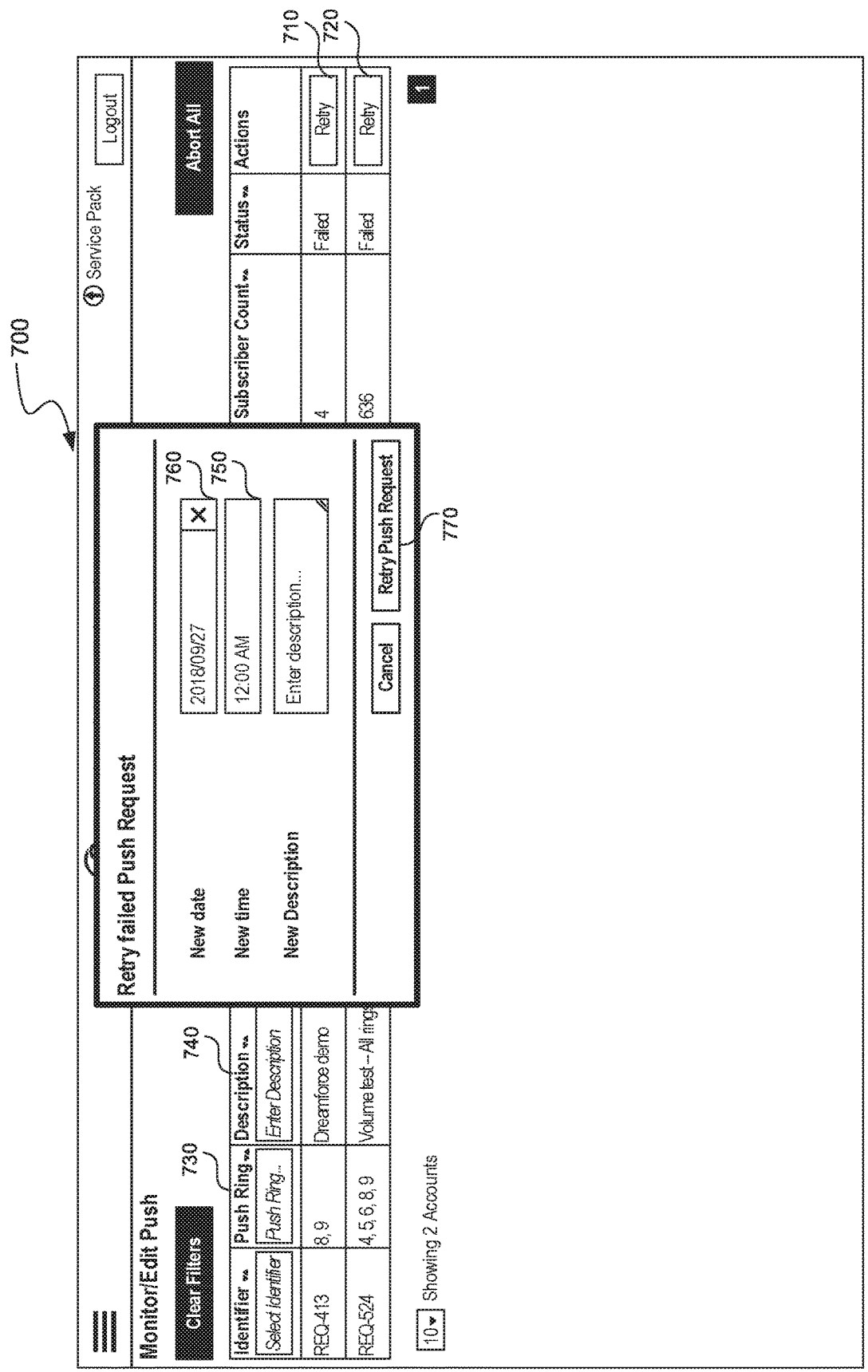
FIG. 7 shows the user interface enabling a retry upon a failure of an application update.

FIG. 7 shows the user interface enabling a retry upon a failure of an application update. Upon pushing the update of multiple software applications to multiple organizations, the technology disclosed here can automatically isolate the updates that have failed and display them to a user in an interface 700. When there are tens or hundreds of failed updates, the ability to visualize a large number of failures in a single user interface, such as user interface 700, aids in managing the failures. The user can manually retry each push through the user interface elements 710, 720.

The user can also group failed updates using any of the parameters 730, 740 (only 2 labeled for brevity) and parameter 410 in FIG. 4, and parameters 210, 220, 230, 240, 250, 260, 270 in FIG. 2. With or without grouping the failed updates, the user can retry all of the failures displayed in the user interface 700 through a single action authorization using the user interface element 770. In addition, using the user interface elements 750, 760, the user can schedule the date and time of the retry.

The processor can perform automatic retries. For example, if the first push fails, after a predefined period of time, such as a minute, the processor can retry the failed push automatically.

Figure 8:
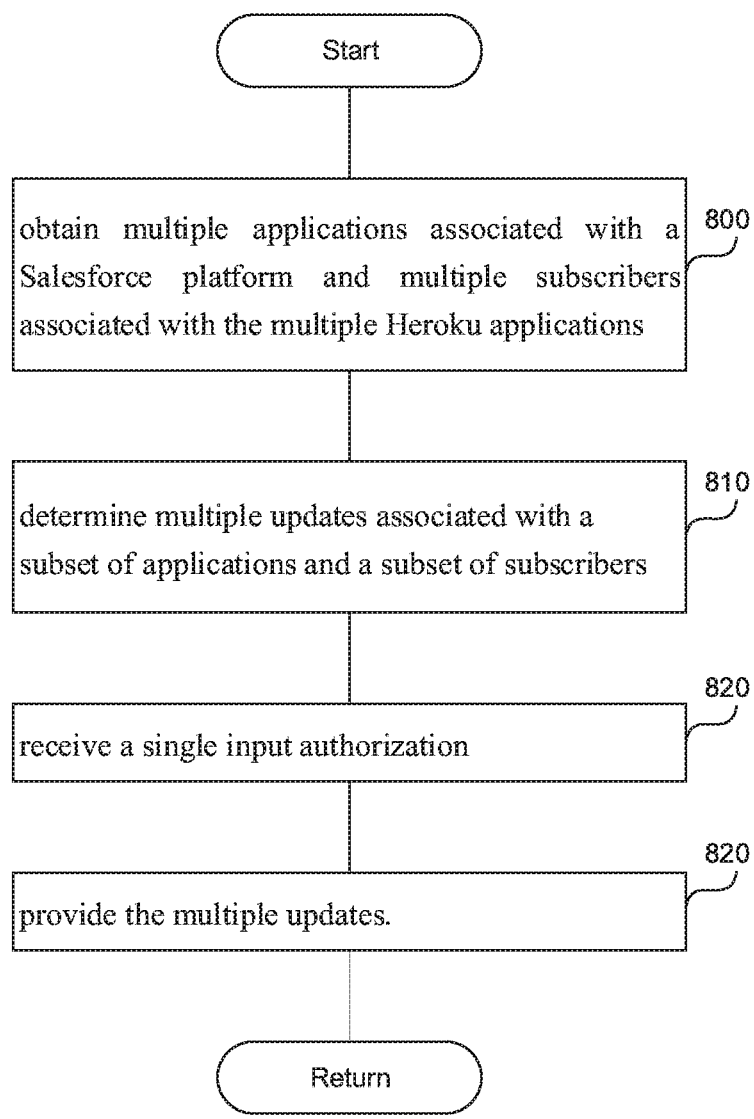
FIG. 8 is a flowchart of a method to enable multiple application updates associated with the Salesforce platform to be delivered to multiple subscribers.

FIG. 8 is a flowchart of a method to enable multiple application updates associated with the Salesforce platform to be delivered to multiple subscribers. The method can be implemented using a Heroku application, such as a Heroku connect application associated with the Salesforce platform. The method enables a user to manage multiple applications and multiple subscribers in an operationally constrained environment limiting the number of applications or a number of subscribers to one. As explained in this application, the operationally constrained environment can be the Salesforce platform which can require the user to perform operations on a single product and a single version. For multiple products in multiple versions, the user would have to repeat the operations for each product in each version. By contrast, the method disclosed here enables operations on tens of thousands of products and/or subscribers at the same time using only two or three inputs from the user. In addition, the method disclosed here can perform the operations on tens of thousands of products and subscribers without noticeable delay to the user, such as within several seconds.

In step 800, a processor can obtain multiple applications associated with a Salesforce platform and multiple subscribers associated with the multiple applications. Each subscriber among the multiple subscribers can be subscribed to at least one application among the multiple applications. The multiple Heroku applications can include more than 10 applications, while multiple subscribers can include more than 10 subscribers. The method disclosed here can handle over 1,000 subscribers and over 100 packages and can, in a single push, handle over 10,000 updates.

In step 810, a processor can determine multiple updates associated with a subset of applications among the multiple applications and a subset of subscribers among the multiple subscribers to whom to deliver at least one update among the multiple updates. To determine the multiple updates, the processor can receive information from a database from which software applications have an update available, and which organizations have subscribed to for the upgrade. In addition, the processor can obtain from the database information regarding the timing of the update, and whether the update should be delayed.

In step 820, the processor can receive a single input authorization without having to receive an authorization for every single update. The single input authorization can be a voice command, a keypress, a gesture, or a mouse click.

In step 830, upon receiving the single input authorization, the processor can provide the multiple updates associated with the subset of applications to the subset of subscribers. By contrast, using Salesforce, the processor would need to authorize every single software package in order to schedule the push related to that product and version. The single input authorization, in addition to saving user effort, saves computing power by not requiring the processor to perform authorizations for every single software package out of hundreds or thousands of software packages. As a result, more than 15 minutes of processor time can be saved.

Figure 9:
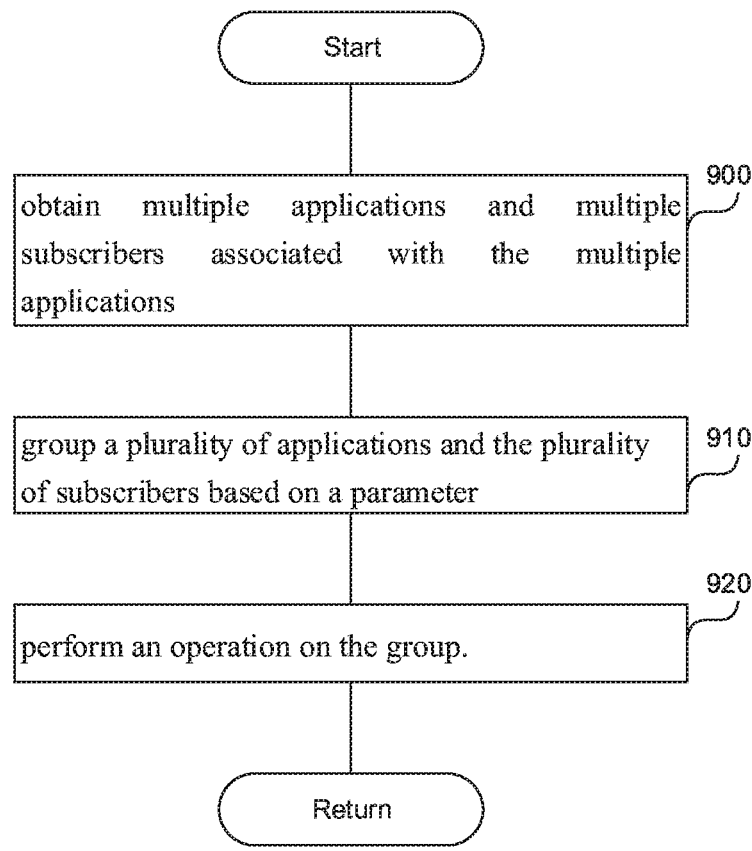
FIG. 9 is a flowchart of a method to enable multiple application updates to be delivered to multiple subscribers.

FIG. 9 is a flowchart of a method to enable multiple application updates to be delivered to multiple subscribers. In step 900, the processor can obtain multiple applications and multiple subscribers associated with the multiple applications. At least one subscriber among the multiple subscribers can be subscribed to at least one application among the multiple applications.

The method enables a user to manage multiple applications and multiple subscribers in an operationally constrained environment limiting the number of applications or a number of subscribers to one. As explained in this application, the operationally constrained environment can be the Salesforce platform which can require the user to perform operations on a single product and a single version. For multiple products in multiple versions, the user would have to repeat the operations for each product in each version. By contrast, the method disclosed here enables operations on tens of thousands of products and/or subscribers at the same time using only two or three inputs from the user. In addition, the method disclosed here can perform the operations on tens of thousands of products and subscribers without noticeable delay to the user, such as within several seconds.

In step 910, the processor can group multiple applications and the multiple subscribers based on a parameter including an application, an application version, an organization name, an organization type, description of the update, and/or any of the parameters 410 in FIG. 4, and parameters 210, 220, 230, 240, 250, 260, 270 in FIG. 2. The parameter can be specified by the user through the user interface, as shown in FIGS. 2, 4. The processor can also perform the grouping automatically, by determining which applications have available updates and which organizations are interested in the updates. The processor can display the grouping to aid the user in visualizing the group.

In step 930, the processor can perform an operation. The operation can be received from the user, such as a single authorization to push the updates to the subscribers. The operation can also be an edit, such as adding or removing items from the group, and/or a retry for failed updates. The processor can perform an operation on the order of 10,000 items, without a perceptible delay to the user, such as a delay of less than 1 second. For example, the processor can dispatch the updates of all the items on the list within less than 1 second.

The processor can obtain multiple applications and multiple subscribers associated with the multiple applications. At least one subscriber among the multiple subscribers can be subscribed to at least one application among the multiple applications. The multiple applications can include more than 10 applications, while multiple subscribers can include more than 10 subscribers. The method disclosed here can handle over 1,000 subscribers and over 100 packages and can, in a single push, handle over 10,000 updates.

The processor can determine multiple updates associated with a subset of applications among the multiple applications and a subset of subscribers among the multiple subscribers to whom to deliver at least an update among the multiple updates. To make the determination, the processor can obtain information such as the applications for which updates are available, organizations that are registered to receive the update, and/or when the update should be pushed to the organization. Based on the information, the processor can schedule the updates at the appropriate time. Also, the processor can receive an input from the user indicating the multiple updates and a subset of subscribers among the multiple subscribers to whom to deliver at least an update among the multiple updates.

The processor can receive a single input authorization, without having to receive an authorization for every single update. Given that there can be 10,000 updates, the ability to receive a single input authorization, without having to receive 10,000 authorizations, not only saves user's time, but also can save up to 2½ hours of processor time. Upon receiving the single input authorization, the processor can provide the multiple updates associated with the subset of applications to the subset of subscribers.

The processor can visualize each subscriber among the multiple subscribers, each application in the plurality of applications, a relationship between subscribers among the multiple subscribers, and an application among the multiple applications. The relationship can include information, such as whether the subscriber has the application installed, the version of the application, what sub-organization within the subscriber organization has the application installed (i.e., whether the testing sub-organization or the production sub-organization), whether the subscriber wants the update, and/or when the update is desired. The processor can visualize all subscribers, products, and versions so that a release schedule can be prepared in advance. By contrast, other platforms, such as Salesforce, can only show the list of eligible subscribers once a product and the version of the product has been selected. The ability to visualize up to 10,000 potential updates at once provides for a much more efficient user interface by enabling the user to review and manipulate large amounts of information, without having to operate on each update individually. Upon visualizing the potential updates, the processor can receive an input from the user indicating the multiple updates and a subset of subscribers among the multiple subscribers to whom to deliver at least an update among the multiple updates.

The processor can visualize information related to the multiple subscribers, the information comprising account information, organization identification (ID), organization name, and organization type. Organization type can include production or sandbox. Production type indicates that the organization, or sub-organization, wants to receive stable software, and is not interested in testing early versions of the software. Sandbox type indicates that the organization, or sub-organization, can receive an early version of the software, and is interested in testing the software prior to the software being deployed to production. Other platforms, such as Salesforce user interface, can only show organization ID and organization name, without providing additional information, such as the organization type. Without knowing the organization type, selecting subscribers for the early version of an update can be impossible.

The processor can present to the user the organization type and can receive from the user an input specifying an organization type associated with the subset of subscribers. As explained above, the organization type can include a testing organization type or a production organization type. The processor can deliver the multiple updates to the subset of subscribers having the organization type matching the user input.

For example, the user input can specify "sandbox" or "testing branch." As a result, the processor can update the software versions of organizations having the type "sandbox" or "testing branch."

The processor can receive from the subset of subscribers information regarding a performance of the multiple updates. The information can contain problems encountered with the update, such as bugs, and a priority of the problems ordered according to severity. For example, the priority of level 1 can indicate that the problem must be fixed prior to releasing to the production organization, while lower priorities can indicate problems that can be fixed later.

When the user input indicates the testing organization type, the processor can determine whether to deliver the multiple updates to the production organization type based on the information regarding the performance of the multiple updates. To determine whether to deliver the multiple updates to the production organization type, the processor can determine whether there are any level 1 problems preventing the update to the production organization type. If there are no level 1 problems, the processor can automatically determine to push the updates to the production organization type. The processor can schedule the push for a particular date. By contrast, other platforms, such as Salesforce, are not able to distinguish between testing organization type and production organization type, and independent of whether the update can be pushed to the production organization type, other platforms do not automatically make the decision to update the production organization type.

The processor can automatically determine the organization type to which to deliver the update. The processor can obtain multiple versions corresponding to the multiple updates. Based on each version among the multiple versions, the processor can determine an organization type associated with the version. For example, if a version of an update among the multiple updates indicates that the update is a testing update, such as an alpha version or a beta version, the processor can automatically determine that the update should be released to a testing organization type, as opposed to a production organization type. When the version of the update indicates that the update is ready for production, the processor can automatically determine that the object should be released to the production organization type. Upon making the determination, the processor can deliver the multiple updates to the subset of subscribers, each subscriber in the set of subscribers having the determined organization type, such as production or testing.

The processor can run each update, prior to pushing to a subscriber, through a test suite. The test suite can include various inputs to the software to be updated to test performance metrics, such as memory consumption, correctness of the output, and/or processing speed. The processor can obtain the test suite from a database. Prior to providing the multiple updates associated with the subset of applications to the subset of subscribers, the processor can record a first performance metric by running an application in the subset of applications using the test suite and measuring the first performance metric. The processor can also record a second performance metric by running an update among the multiple updates using the test suite and measuring the second performance metric. When the second performance metric is within a predefined threshold of the first performance metric, the processor can push the update.

For example, first performance metric can specify the desired output, and the predefined threshold can be 1%. The software update can run through the test suite, and can produce the output (i.e., the second performance metric). When the second performance metric is within 1% of the first performance metric, the processor can determine that the test been satisfied, and that the update can be pushed to the user. In another example, the first performance metric can specify the desired memory footprint, and the desired threshold can be 25%. The software update can run through the test suite, and the processor can measure the memory footprint of the software update to obtain the second metric. When the second metric is within 25% of the first performance metric, the processor can determine that the update can be pushed to the user. The test suite can include Salesforce's ISV Hammer.

Prior to providing the multiple updates associated with the subset of applications to the subset of subscribers, the processor can edit the multiple updates or the subset of subscribers. Editing can include adding and/or removing updates and/or subscribers, and/or changing update versions. The technology disclosed here allows editing a push that has already been scheduled. However, other platforms, such as Salesforce UI, only allows canceling a whole push and selecting organizations, updates, and creating the schedule from the beginning. When there are up to 10,000 items that have to be scheduled for a push, having to cancel the whole push and start from beginning can add hours of human and processor time to the whole process.

The processor can visualize the subset of subscribers eligible to receive the multiple updates as a single group. Regardless of whether the subscribers are eligible to receive different software applications and/or different versions of the software applications, the processor can provide a visualization that groups all subscribers.

In other platforms, such as in Salesforce, a user needs to log in to every single software application to check whether the subscriber is eligible for the update. Having to select every single application, when dealing with up to 1,000 software applications, can add up to 17 minutes of user and processor time to perform the task. By contrast, the ability to visualize all the subscribers and all the update as a single group can save up to 17 minutes of user and processor time.

Once the software application has been selected, the current Salesforce user interface takes around 20 minutes to load the subscribers eligible to receive the selected software application. By contrast, the technology disclosed here takes only a few seconds to show eligible subscribers based on product and version selection.

The processor can group the multiple subscribers into one or more groups based on an attribute comprising an availability of updates associated with the multiple applications. The attribute can be any of the parameter 410 in FIG. 4, and parameters 210, 220, 230, 240, 250, 260, 270 in FIG. 2. The processor can aid in visualizing the one or more groups. The visualization can aid the user in understanding which updates should be pushed to which organizations. The technology disclosed here allows the user to group subscribers so that the user can more quickly review the data before scheduling the push.

The processor can receive an input from a user including a subscriber to exclude from the subset of subscribers, even though the subscriber has an update that is available for a push. The processor can modify the subset of subscribers by excluding the subscriber and can provide the multiple updates associated with the subset of applications to the modified subset of subscribers.

The processor can obtain organizational information associated with a subscriber among the multiple subscribers. The organizational information can include an organization ID, organization name, and organization type. The processor can visualize organizational information. The organization type can include production or sandbox, as explained in this application.

The processor can determine that an update among the multiple updates has failed. The failure can generate an error, and the processor can analyze the generated error to automatically determine the cause of the failure. Upon identifying the cause of the failure, the processor can fix the failure automatically or can notify a user.

Upon determining that a failure has occurred, the processor can repeatedly provide the update to the subscriber until the update succeeds or a predetermined number of attempts, such as 5 attempts, has failed. The repeated attempts to provide the update can be separated by a predetermined time period, such as several minutes or several hours.

Computer

Figure 10:
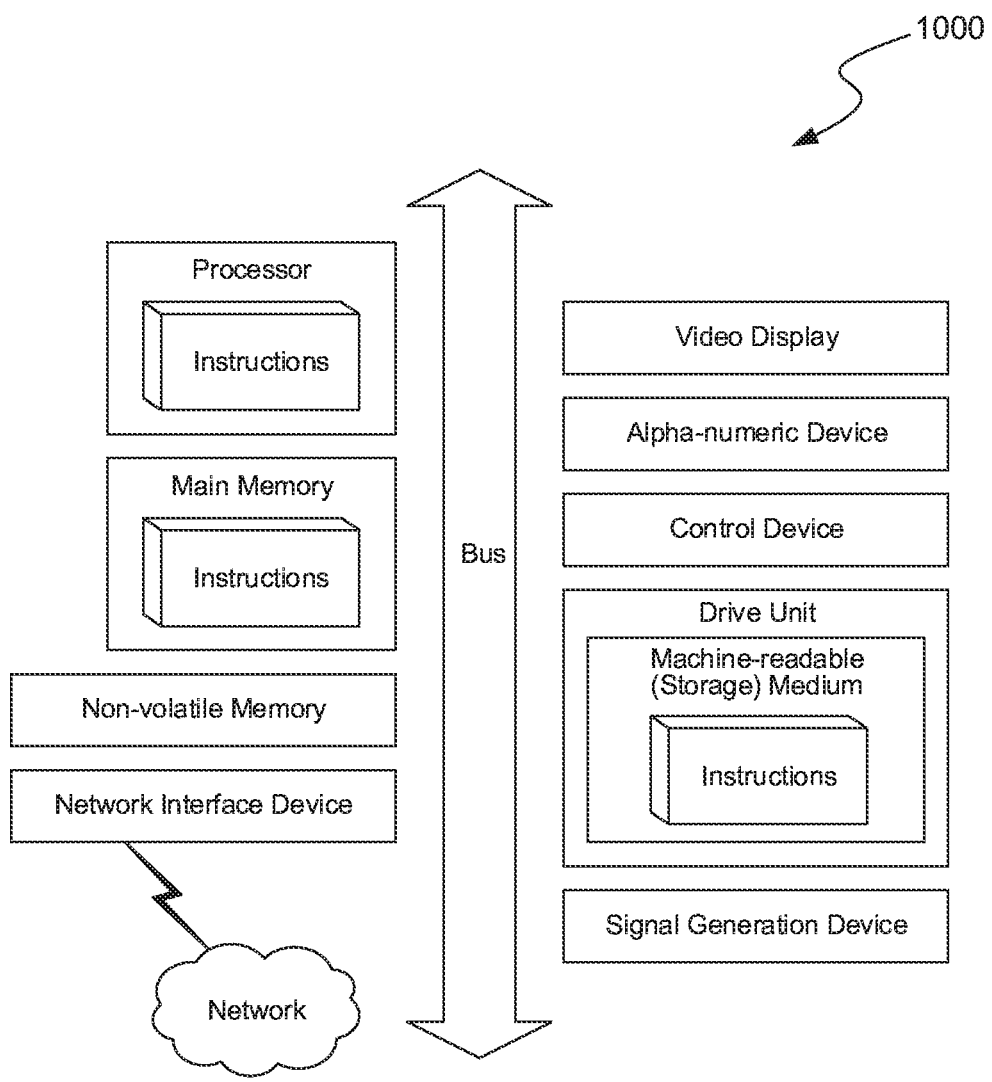
FIG. 10 is a diagrammatic representation of a machine in the example form of a computer system, within which a set of instructions for causing the machine to perform any one or more of the methodologies or modules discussed herein, may be executed.

FIG. 10 is a diagrammatic representation of a machine in the example form of a computer system 1000 within which a set of instructions for causing the machine to perform any one or more of the methodologies or modules discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

The processor of FIG. 10 can be the processor implementing the various methods described in this application. For example, the processor can implement one or more of the methods of the vendor platform 130 in FIG. 1. The main memory, drive unit, and/or the non-volatile memory in FIG. 10 can store the instructions to be executed by the processor in FIG. 10. The network in FIG. 10 can enable the communication between various modules, such as the software applications 105, 115, 125 in FIG. 1, intermediate modules 107, 117, 127 in FIG. 1, and/or the communication module 108 in FIG. 1.

This disclosure contemplates the computer system 1000 taking any suitable physical form. As an example and not by way of limitation, computer system 1000 may be an embedded computer system, a system-on-chip (SOC), a single-board computer system (SBC), such as, for example, a computer-on-module (COM) or system-on-module (SOM), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

The processor may be, for example, a conventional microprocessor such as an Intel Pentium Microprocessor™ or Motorola power PC Microprocessor™. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a compact disk read-only memory (CD-ROM), EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine-readable or computer-readable media used to actually effect the distribution.

Further examples of machine-readable storage media, machine-readable media, or computer-readable (storage) media include, but are not limited to, recordable type media, such as volatile and non-volatile memory devices, floppy and other removable disks, hard disk drives, optical disks (e.g., CD ROMS, digital versatile disks, (DVDs), etc.), among others, and transmission type media, such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The language used in the specification has been principally selected for readability and instructional purposes, and it may not have been selected to delineate or circumscribe the inventive subject matter. It is therefore intended that the scope of the invention be limited not by this Detailed Description, but rather, by any claims that issue on an application based hereon. Accordingly, the disclosure of various embodiments is intended to be illustrative, but not limiting, of the scope of the embodiments, which is set forth in the following claims.

The invention claimed is:

1. A method to enable a plurality of application updates associated with a Salesforce platform to be delivered to a plurality of subscribers, the method comprising:
    managing a plurality of applications and the plurality of subscribers in an operationally constrained environment limiting the number of applications or a number of subscribers to one, said managing comprising:
        obtaining, using a Heroku application, the plurality of applications associated with the Salesforce platform and the plurality of subscribers associated with the plurality of applications, wherein each subscriber in the plurality of subscribers is subscribed to at least one application in the plurality of applications;
        determining, using the Heroku application, a plurality of updates associated with a subset of applications in the plurality of applications and a subset of subscribers in the plurality of subscribers to whom to deliver at least an update in the plurality of updates;
        receiving a single input authorization; and
        upon receiving the single input authorization, providing the plurality of updates associated with the subset of applications to the subset of subscribers.

2. A method comprising:
    managing a plurality of applications and a plurality of subscribers in an operationally constrained environment limiting a number of applications or a number of subscribers by:
        obtaining the plurality of applications and the plurality of subscribers associated with the plurality of applications, wherein at least one subscriber in the plurality of subscribers is subscribed to at least one application in the plurality of applications;
        grouping the plurality of applications and the plurality of subscribers based on a parameter comprising an application, an application version, an organization name, and an organization type to obtain a group, the parameter comprising an account information and an organization identification (ID);
    performing an operation on the group.

3. The method of claim 2, comprising:
    determining a plurality of updates associated with a subset of applications in the plurality of applications and a subset of subscribers in the plurality of subscribers to whom to deliver at least one update in the plurality of updates;

receiving a single input authorization; and
upon receiving the single input authorization, providing the plurality of updates associated with the subset of applications to the subset of subscribers.

4. The method of claim 3, said grouping comprising receiving an input from a user indicating the plurality of updates and the subset of subscribers in the plurality of subscribers to whom to deliver the at least one update in the plurality of updates.

5. The method of claim 3, comprising:
presenting to a user the organization type;
receiving from the user an input specifying the organization type associated with the subset of subscribers, the organization type comprising a testing organization type or a production organization type;
delivering the plurality of updates to the subset of subscribers having the organization type matching the user input;
receiving from the subset of subscribers information regarding a performance of the plurality of updates; and
when the user input indicates the testing organization type, determining whether to deliver the plurality of updates to the production organization type based on the information regarding the performance of the plurality of updates.

6. The method of claim 3, comprising:
obtaining a test suite associated with the plurality of updates;
prior to providing the plurality of updates associated with the subset of applications to the subset of subscribers, obtaining a first performance metric and a second performance metric by running the application in the subset of applications using the test suite, measuring the first performance metric, and running an update in the plurality of updates using the test suite and measuring the second performance metric; and
when the second performance metric is within a predefined threshold of the first performance metric, providing the update.

7. The method of claim 3, comprising:
prior to providing the plurality of updates associated with the subset of applications to the subset of subscribers, editing the plurality of updates or the subset of subscribers.

8. The method of claim 3, said grouping comprising:
visualizing the subset of subscribers eligible to receive the plurality of updates as a single group.

9. The method of claim 3, comprising:
grouping the plurality of subscribers into one or more groups based on an attribute comprising an availability of updates associated with the plurality of applications; and
visualizing the one or more groups.

10. The method of claim 3, comprising:
receiving an input from a user comprising a subscriber to exclude from the subset of subscribers;
modifying the subset of subscribers by excluding the subscriber; and
providing the plurality of updates associated with the subset of applications to the modified subset of subscribers.

11. The method of claim 3, comprising:
obtaining organizational information associated with a subscriber in the plurality of subscribers, the organizational information comprising an organization ID, the organization name, and the organization type; and
visualizing the organizational information.

12. The method of claim 3, comprising:
determining that an update in the plurality of updates has failed; and
repeatedly providing the update until the update succeeds or a predetermined number of attempts has failed.

13. A system comprising a non-transitory computer readable medium having one or more computer program instructions configured to:
manage a plurality of applications and a plurality of subscribers in an operationally constrained environment limiting a number of applications or a number of subscribers by:
obtain a plurality of applications and a plurality of subscribers associated with the plurality of applications, at least one subscriber in the plurality of subscribers subscribed to at least one application in the plurality of applications;
determine a plurality of updates associated with a subset of applications in the plurality of applications and a subset of subscribers in the plurality of subscribers to whom to deliver at least one update in the plurality of updates;
receive a single input authorization;
upon receiving the single input authorization, provide the plurality of updates associated with the subset of applications to the subset of subscribers; and
visualize information related to the plurality of subscribers, the information comprising account information, organization identification (ID), organization name, and organization type.

14. The system of claim 13, wherein the one or more computer program instructions are further configured to:
present to a user an organization type;
receive from the user an input specifying the organization type associated with the subset of subscribers, the organization type comprising a testing organization type or a production organization type;
deliver the plurality of updates to the subset of subscribers having the organization type matching the user input; and
receive from the subset of subscribers information regarding a performance of the plurality of updates.

15. The system of claim 13, wherein the one or more computer program instructions are further configured to:
obtain a plurality of versions corresponding to the plurality of updates;
based on each version in the plurality of versions determine an organization type associated with the version; and
deliver the plurality of updates to the subset of subscribers, each subscriber in the subset of subscribers having the determined organization type.

16. The system of claim 13, wherein the one or more computer program instructions are further configured to:
obtain a test suite associated with the plurality of updates;
prior to providing the plurality of updates associated with the subset of applications to the subset of subscribers, obtain a first performance metric and a second performance metric by running an application in the subset of applications using the test suite, measuring the first performance metric, and running an update in the plurality of updates using the test suite and measuring the second performance metric; and
when the second performance metric is within a predefined threshold of the first performance metric, provide the update.

17. The system of claim 13, wherein the one or more computer program instructions are further configured to:
- receive an input from a user comprising a subscriber to exclude from the subset of subscribers;
- modify the subset of subscribers by excluding the subscriber; and
- provide the plurality of updates associated with the subset of applications to the modified subset of subscribers.

18. The system of claim 13, wherein the one or more computer program instructions are further configured to:
- determine that an update in the plurality of updates has failed; and
- repeatedly provide the update until the update succeeds or a predetermined number of attempts has failed.

\* \* \* \* \*